Figure 1:
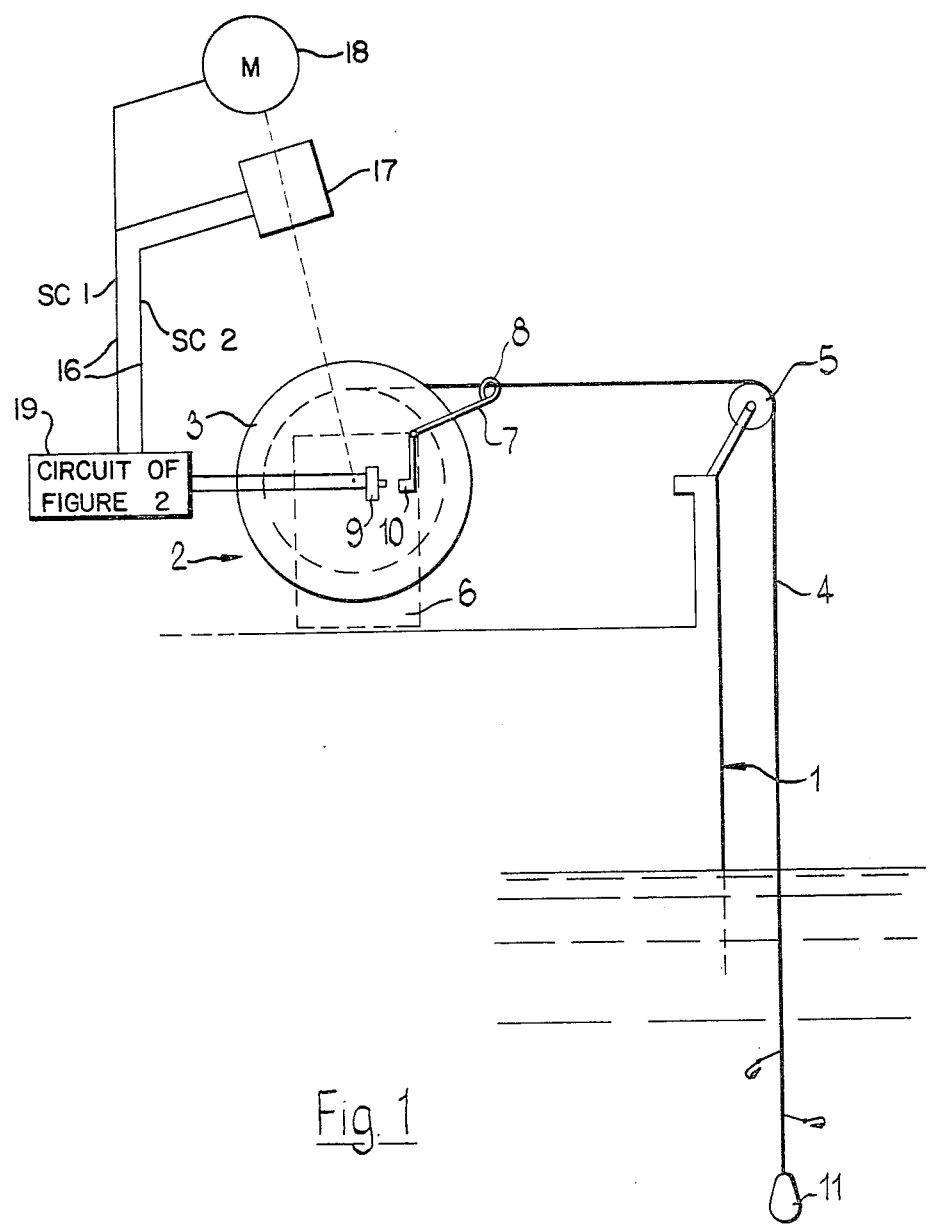

United States Patent [19]

Christiansen

[11] 4,418,491

[45] Dec. 6, 1983

[54] AUTOMATIC ANGLING MACHINE

[76] Inventor: Thorbjorn Christiansen, N-8400 Sortland, Norway

[21] Appl. No.: 56,063

[22] Filed: Jul. 9, 1979

[30] Foreign Application Priority Data

Jul. 13, 1978 [NO] Norway ................................. 782433

[51] Int. Cl.³ ........................ A01K 89/017; B66D 1/48
[52] U.S. Cl. ................. 43/26.1; 242/84.1 A; 254/273
[58] Field of Search ......................... 43/15, 4, 21, 26.1, 43/27.4, 6.5; 242/84.1 A, 106, 36, 37 R, 49; 33/126.6; 200/61.18, 61.14; 254/273

[56] References Cited

U.S. PATENT DOCUMENTS

| | | | |
|---|---|---|---|
| 1,848,972 | 3/1932 | Peebles | 200/61.18 |
| 2,709,867 | 6/1955 | Routh | 43/15 |
| 2,922,808 | 12/1975 | Rieth et al. | 43/4 |
| 3,253,269 | 5/1966 | Ratti | 200/61.18 |
| 3,365,833 | 1/1968 | Christiansen | 43/15 |
| 3,370,800 | 2/1968 | Haberkern | 242/36 |
| 3,418,627 | 12/1968 | Lyons | 200/61.18 |
| 3,710,499 | 1/1973 | Jadano | 43/6.5 |
| 3,836,122 | 9/1974 | Pierce, Jr. | 254/273 |
| 3,975,854 | 8/1976 | Graham | 43/6.5 |

FOREIGN PATENT DOCUMENTS

| | | | |
|---|---|---|---|
| 70199 | 3/1946 | Norway | 43/27.4 |
| 1317293 | 5/1973 | United Kingdom | 43/27.4 |
| 296541 | 3/1971 | U.S.S.R. | 43/27.4 |

*Primary Examiner*—Billy S. Taylor

[57] ABSTRACT

A switching arrangement for preventing backlash in an automatic angling machine, to activate and deactivate a braking clutch in the angling machine dependent upon whether or not the fishing line issuing from the line reel of the machine is slackened or taut, respectively. A rocker arm sensing the tension in the issuing fish line effects opening and closing of a switch to provide the activation control to the braking clutch. The switching arrangement is advantageously usable with automatic angling machines for providing automatic control of the sinker depth at the end of the line. In combination with automatic angling machines, a sequence of line letting, bottom sensing, limited line hauling, and fishing mode intervals, all functionally associated with the switching arrangement, is made possible.

2 Claims, 2 Drawing Figures

AUTOMATIC ANGLING MACHINE

The present invention relates to an arrangement in an automatic angling machine comprising a rotatably mounted line reel for winding and unwinding of the fishing line, an electric motor for driving the line reel, an electromagnetic clutch and control circuits for connecting and disconnecting of the various functions of the machine by means of the clutch.

A fully automatic angling machine of the above-mentioned type is i.a. known from U.S. Pat. No. 3,365,833. This known angling or fishing machine comprises a clutch providing for connection and disconnection of various functions, the machine being provided with control circuits and with a depth pointer and a plurality of switches for connection of desired operations and fishing functions. The machine is arranged to start fishing on a certain set fishing depth, it has an automatic hauling function starting at a certain line load, and with a suitable switch position it will provide for automatic "stop in the water surface", i.e. the machine stops when the fishing tackle has been hauled to the water surface.

As disclosed in the Applicant's copending U.S. patent application Ser. No. 8,810, filed on Feb. 2, 1979, now U.S. Pat. No. 4,253,165 such an angling or fishing machine may be provided with electronic control circuits with digital indication of the fishing depth by counting of the number of revolutions of the line reel of the machine, and the machine may further be provided with devices enabling echo sounder control of the fishing depth, so that the machine may fish at a desired distance above the bottom even if the bottom depth increases or decreases.

When such a machine is set or adjusted for fishing at a certain fishing depth, the clutch of the machine is automatically activated when the desired depth is achieved, so that the line reel is braked. If, however, the sinker at the end of the fishing line reaches the bottom before the set fishing depth is achieved, or if a fish stops the downward movement of the sinker, the line reel will, if the line becomes slack, continue rotating as a result of its inertia, so that a "backlash" may occur on the reel (winder) if a braking thereof is not provided for.

The object of the present invention is to provide an arrangement which in a simple manner can provide for automatic activation of the clutch of the machine for connection of e.g. the braking function if and when the line becomes slack during discharge (letting-out) from the reel.

Simultaneously, it is an object of the invention to be able to utilize the clutch activating device in such a way that one may automatically test the bottom depth and with desired time intervals automatically effect adjustment for fishing at a desired distance above the bottom. In this way one may automatically provide for fishing at a desired distance above the bottom without the above-mentioned use of an echo sounder, and by means of the bottom measurement taking device one may effect automatic adjustment of the fishing depth if one wants to fish just above the bottom.

According to the invention an automatic angling machine of the above-mentioned type is provided with a switch operating member operatively connected to the fishing line, and a switch associated therewith and arranged to activate said clutch by actuation from the operating member, the operating member, by its operative connection with said line, being prevented from actuating said switch when the line going out from the reel is in taut condition.

In order to carry out the automatic testing of bottom depth, in connection with an automatic machine which is provided with depth control circuits comprising comparators controlling the fishing functions (e.g., maintaining fishing position and automatic line hauling at sensing a predetermined line load) of the machine in dependence of correpondance between a set fishing depth and the position of a plurality of counters indicating the fishing depth, an embodiment of the invention is characterized in that, between said switch and the clutch, there is provided an electronic circuit which, during line discharge in progress, causes initiation of the hauling function of the machine for a predetermimed period of time by closing of said switch, and is arranged to co-operate with the automatic depth control circuits to cause, sequentially, time-limited operation of the fishing functions of the machine and thereafter repeated line discharge until another closing of said switch.

Figure 2:
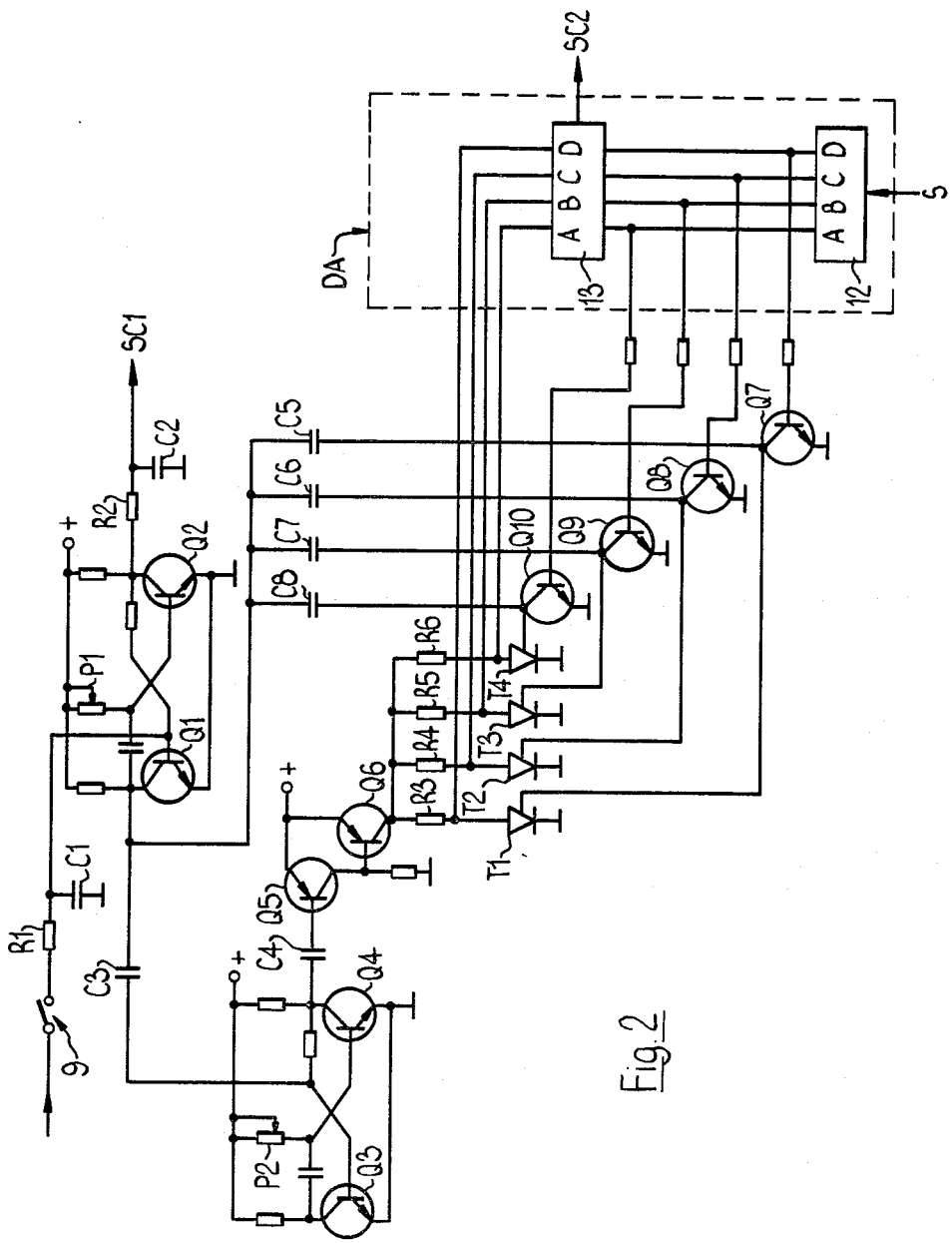

The invention will be described more closely in the following in connection with exemplary embodiments with reference to the accompanying drawings, wherein:

FIG. 1 shows a schematic view of a fishing machine disposed on a fishing vessel and provided with a switch device according to the invention; and FIG. 2 shows a circuit diagram of an exemplary embodiment of an electronic circuit co-operating with the switch device and with an automatic depth control circuit in the machine to control the automatic bottom depth testing and fishing depth adjustment.

In the schematic view in FIG. 1 there is shown a fishing vessel 1 on which there is arranged an angling machine 2 with an associated line reel or winder 3. The line 4 from the line reel is running over a roller 5 or the like located on the rail of the vessel. A switch operating member is operatively connected to the fishing line, and in the illustrated embodiment this operating member is in the form of a rocker arm 7, which is mounted as a double-armed lever on the preferably water-tight machine housing 6. As shown, the free end of one arm is formed as a hoop 8 which in a suitable manner is placed over the fishing line 4 between the reel 3 and the roller 5. The free end of the other arm is adapted to actuate a switch 9 which, by actuation from the operating member 7, is adapted to activate a braking clutch 17 of the fishing machine, e.g. for completing the circuit of the braking function thereof. The switch 9 may be a conventional mechanical switch or a magnetic switch which is placed within the water-tight machine housing 6 preferably of non-magnetic material. In the latter case, the proper end of the rocker arm 7 is conveniently provided with a magnet 10 for actuation of the magnetic switch.

If the line sinker 11, during discharge of the line, reaches the bottom before the preset fishing depth is achieved, or if a fish stops the movement of the sinker, the line between the reel 3 and the roller 5 will become slack, the hoop of the rocker arm falls down and the magnet 10 is brought to a position opposite to the magnetic switch 9 and activates the switch so that it is closed. Thereby the electromagnetic clutch 17 is activated so that it brakes the outgoing movement of the reel and a backlash is avoided. When the line is again tensioned, the switch is opened and the braking action ceases.

In FIG. 2 there is shown an embodiment of an electronic circuit 19 (see FIG. 1) which is connected between the above-mentioned switch 9 via wires 14, 15, and the electromagnetic clutch 17 via cable 16, of the machine and includes an automatic depth control circuit, which provides for automatic "bottom measurement taking" with measurements taken at preset time intervals and for automatic fishing at a desired distance above the bottom.

As shown in FIG. 2, the switch 9 is connected through a RC link R1, C1 to the input of a first monostable multivibrator or flip-flop comprising a pair of transistors Q1 and Q2 and associated resistors and capacitors. A potentiometer P1 is provided for adjustment of the switching time of the flip-flop. One output of the flip-flop is connected through a further RC link R2, C2 to the clutch 17 and a motor 18 of the fishing machine to deliver a signal SC1 for activation of the hauling function of the machine for a prescribed period of time. The other output of the flip-flop is connected to the input of a second monostable multivibrator or flip-flop with transistors Q3 and Q4. A potentiometer P2 is provided for adjustment of the switching time of the second flip-flop. An output from the second flip-flop is connected through a capacitor C4 to a transistor stage comprising a pair of transistors Q5 and Q6 and whose output is connected to a gated thyristor circuit cooperating with the automatic depth control circuit of the fishing machine, which automatic circuit is schematically represented by the dashed block DA in FIG. 2.

For a closer description of the automatic depth control circuit DA, reference is made to the above-mentioned U.S. Pat. No. 4,253,165. In FIG. 2 the DA block is shown to comprise a single digital counter 12 having four outputs A–D and a comparator 13 connected therewith. However, it should be noticed that, in practice, there will be provided a number of counters and comparators corresponding to the maximum depth for which the fishing machine is constructed, e.g. three BCD counters such as disclosed in U.S. Pat. No. 4,253,165.

In the illustrated example, the output from the stage Q5, Q6 is connected through four resistors R3, R4, R5, R6 to the anodes of four thyristors T1, T2, T3, T4 whose cathodes are connected to earth. The gate electrodes of the thyristors are connected through respective capacitors C5–C8 to said second output from the first flip-flop Q1, Q2. However, the operation of the thyristors is gate-controlled in such a manner that the state of the anodes thereof is established by a certain counter setting, i.e. a certain fishing depth, and will show the same voltage value (i.e. "low" or "high" voltage value) as the respective outputs A–D of the counter 12. The anodes of the thyristors are connected to respective corresponding comparator inputs A–D. In this way correspondence is achieved in the comparator, and the comparator then delivers a signal SC2 to the clutch which then during a certain time permits normal fishing functions of the machine such as described more closely below.

The above-mentioned gating is achieved in that for each thyristor there is provided an associated NPN transistor of which the collector is connected to the gate electrode of the thyristor, and of which the emitter is connected to earth and the base is connected through a resistor to a respective one of the four connections between the counter 12 and the comparator 13. In FIG. 2 the gating or control transistors are designated Q7, Q8, Q9 and Q10, the transistor Q7 being associated with the thyristor T1 and counter output D, the transistor Q8 being associated with the thyristor T2 and counter output C, etc.

In the following the operation of the described arrangement will be described for the case that the ocean depth becomes larger and larger.

When the sinker of the fishing line stops at the bottom, the rocker arm 7 falls down when the line becomes slack. Thereby the switch 9 is closed and current is supplied to the RC link R1, C1. The time constant of the RC link is such that the transistor Q1 is made conductive after approximately 2 seconds, i.e. Q1 becomes "low" and the flip-flop is connected or set. The collector of the transistor Q2 then becomes "high", and through the RC link R2, C2 current (the signal SC1) is supplied to the clutch and the motor for a predetermined time or distance that the line is hauled in, e.g. by a distance equal to approximately 3 revolutions of the line reel or e.g. for a time period of approximately 2 seconds. After a suitably chosen time (e.g. a couple of seconds) determined by the setting of the potentiometer P1, the flip-flop is switched back and the collector of the transistor Q1 becomes "high". Thereby the second flip-flop Q3, Q4 is connected or switched in, which flip-flop is set for a duration of approximately 1 minute by means of the potentiometer P2.

When the collector of the transistor Q1 becomes "high", the thyristors T1–T4 may be fired in that their gate electrodes are supplied with current through the capacitors C5–C8. The condition for firing of e.g. T1 is, however, such that it does not have any base current on the associated gate transistor Q7, which is in turn dependent upon the counter setting. Thus, in this case the counter output D must be "low", i.e. have the logic value "0". When the counter output D is "low", the transistor Q7 is shut off, the thyristor T1 is fired so that the anode becomes "low" and the comparator input D becomes "low". In like manner, all other thyristors T2–T4 assume the same logic condition as the respective output of counter 12, whether "high" or "low". As there is thus achieved correspondence between the counter and the comparator, the comparator delivers said SC2 signal, and the machine will then be fishing at the adjusted or set fishing depth until the flip-flop Q3, Q4 again switches over after approximately 1 minute. The collector of the transistor Q4 then becomes "low" and for a moment the transistor Q5 receives base current through the capacitor C4. For a moment the transistor Q6 becomes shut-off, so that all the thyristors are extinguished. All inputs to the comparator thereby become "high" (logic "1"), no comparison correspondence is made, and a signal is delivered to the clutch which causes that the line is let out until the sinker again hits the bottom. The described process will then repeat itself.

If, however, the ocean depth becomes smaller and smaller, the sinker may hit the bottom before the second flip-flop Q3, Q4 switches over. In a similar manner as described above, the transistor Q1 then becomes conducting by current supply from the switch in connection with the line-actuated arm. Current is then extracted from the base of the transistor Q3, and the flip-flop Q3, Q4 thereby switches over and all the thyristors are extinguished. Simultaneously Q2 becomes "high" so that the clutch receives current and causes hauling of the line such as described above.

As will be appreciated by a technically skilled person, the circuit device shown in FIG. 2 may be modified in many different manners without departing from the inventive concept. For example, instead of thyristors, other controllable elements with a memory function, e.g. flip-flops, may be used. In practice the circuit may conveniently be constructed with integrated circuits.

What I claim is:

1. In an automatic angling machine comprising a machine housing, a line reel rotatably mounted on said housing for winding and unwinding of fishing line, an electric motor for driving said line reel, an electromagnetic clutch, control circuits for controlling operation of said motor and said clutch in a prescribed manner to effect a plurality of fishing functions of the machine, a switch operating member operatively coupled to said fishing line, an automatic depth control circuit, and a switch actuated by movement of said operating member for activating said clutch, the improvement comprising: an improved switch operating member including a rocker arm pivotably mounted on said housing to function as a double-armed lever, said rocker arm being pivotable from a first position to a second position, the free end of one arm constituting a hoop placed over said fishing line issuing from said line reel, the free end of the other arm arranged to actuate said switch when the hoop end pivots from said first position to said second position when the line is in a slack condition, said operating member, by its operative coupling with said line, being maintained in said first position and prevented from actuating said switch when the line issuing from said ine reel is in a taut condition; a plurality of counters and comparators in said depth control circuit for controlling operation of said motor and clutch to effect prescribed ones of said fishing functions of the machine in independence on correspondence between a set fishing depth and the counts of a plurality of said counters indicating the fishing depth; and, between said switch and said clutch and motor, an electronic circuit which, during line discharge in progress, causes actuation of said motor to effect a hauling function of the machine for a first preset period of time by the closing of said switch, and which is arranged to cooperate with said automatic depth control circuit to effect a normal fishing mode function of the machine for a second preset period of time, and thereafter cause repeated line discharge until another closing of said switch.

2. In an automatic angling machine comprising a machine housing, a line reel rotatably mounted on said housing for winding and unwinding of fishing line, an electric motor for driving said line reel, an electromagnetic clutch, control circuits for controlling operation of said motor and said clutch in a prescribed manner to effect a plurality of fishing functions of the machine, a switch operating member operatively coupled to said fishing line, an automatic deptch control circuit, and a switch actuated by movement of said operating member for activating said clutch, the improvement comprising: an improved switch operating member including a rocker arm pivotably mounted on said housing to function as double-armed lever, said rocker arm being pivotable from a first position to a second position, the free end of one arm constituting a hoop placed over said fishing line issuing from said line reel, the free end of the other arm arranged to actuate said switch when the hoop end pivots from said first position to said second position when the line is in a slack condition, said operating member, by its operative coupling with said line, being maintained in said first position and prevented from actuating said switch when the line issuing from said line reel is a taut condition; a plurality of counters and comparators in said depth control circuit for controlling operation of said motor and clutch to effect prescribed ones of said fishing functions of the machine in dependence on correspondence between a set fishing depth and the counts of a plurality of said counters indicating the fishing depth; and, between said switch and said clutch and motor, an electronic circuit which, during the line discharge in progress, causes actuation of said motor to effect a hauling function of the machine for a first preset period of time by the closing of said switch, and which is arranged to cooperate with said automatic depth control circuit to effect a normal fishing mode function of the machine for a second preset period of time, and thereafter cause repeated line discharge until another closing of said switch; and wherein said electronic circuit comprises a first monostable multivibrator of which one output is connected to said clutch to cause initiation of the hauling function of the machine, and of which a second output is connected to a control circuit which, at a given setting of a plurality of counters in said automatic depth control circuit, provides for accordance between said counters and comparators for the initiation said normal fishing mode function of the machine.

* * * * *